Nov. 17, 1964    R. A. CAMPBELL ETAL    3,157,852
VOLTAGE GENERATING SEISMIC VIBRATORY PICKUP DEVICE
Filed Feb. 1, 1960
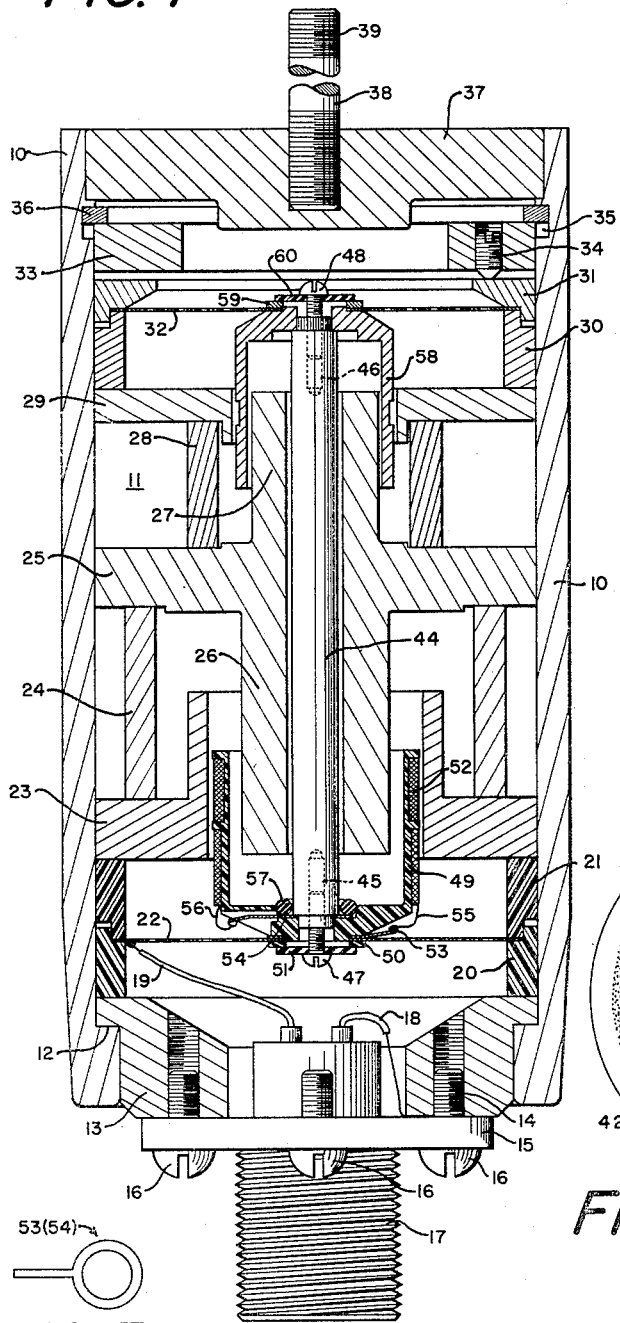
FIG. 1
FIG. 3
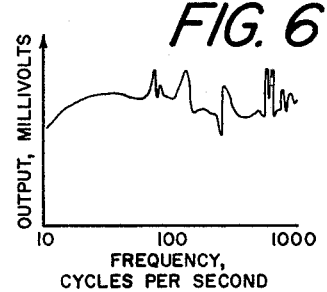
FIG. 6
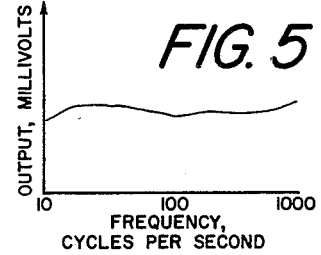
FIG. 5
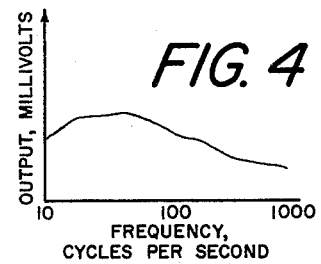
FIG. 4
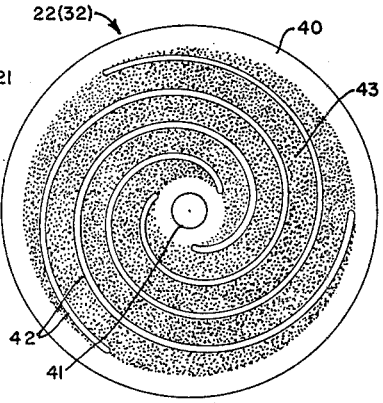
FIG. 2
INVENTORS.
RALPH A. CAMPBELL
THEODORE ONGARO
GLEN H. THOMAS
BY Harry B. Keck
ATTORNEY

United States Patent Office 3,157,852
Patented Nov. 17, 1964

3,157,852
VOLTAGE GENERATING SEISMIC VIBRATORY PICKUP DEVICE
Ralph A. Campbell, Theodore Ongaro, and Glen H. Thomas, Columbus, Ohio, assignors to International Research and Development Corporation, Worthington, Ohio, a corporation of Ohio
Filed Feb. 1, 1960, Ser. No. 5,753
5 Claims. (Cl. 340—17)

This invention relates to vibration detection apparatus and more particularly to a seismic vibration pickup device adapted to generate electrical signals responsive to vibratory forces imparted to the apparatus from extraneous sources.

A strong, rugged, yet sensitive seismic vibratory pickup device has been described in U.S. Patent 2,754,435 which embodies an oscillatable inductive coil positioned in a permanent magnetic field. As the casing is subjected to extraneous mechanical vibrations, the inductive coil, mounted between a pair of diaphragm springs, maintains its position through mass inertia and cuts lines of magnetic flux to generate an electrical signal responsive to the mechanical vibrations which are applied to the casing.

The casings of such pickup devices have been filled with viscous oil to serve as a damping fluid offsetting the natural resonating tendencies of the spring mounted inertia coils. However, the presence of oil in the casing limits the temperature range over which the pickup device can be utilized. At temperatures above about 110° F., the oil becomes more fluid and tends to leak from the casing. At temperatures approaching 0° F., the oil becomes viscous. Sealing of the oil-filled casing has proved to be a production problem.

When the damping oil is eliminated, the response of the prior art pickup devices has been adversely affected. Firstly, the natural resonating characteristics of the spring mounted inertia mass tend to cause excessive voltage output response at vibration frequencies near the resonating frequency. Secondly, the diaphragm springs which are employed as the oscillatable mounting exhibit natural reed resonance at various frequencies which tends to affect the voltage output response over the entire range of vibration frequencies.

The natural resonating characteristics of the spring mounted inertia mass can be offset by providing electromagnetic damping of the inertia mass. This is achieved by placing a metal bobbin in the magnetic field of the device to serve as an infinite number of closed turns which will move with respect to the magnetic field in the same direction and at the same rate as the signal coil. The metal bobbin alternatively may be considered as a single closed turn having very low electrical resistance by virtue of its substantial cross-section. As the metal bobbin moves with respect to the magnetic field, a short circuited electrical signal is induced within the bobbin which tends to resist further relative motion and hence provides electromagnetic damping.

Provision of a metal bobbin proved effective in offsetting the natural resonance of the inertia mass but introduced a new problem in the pickup device, namely, an objectionable decrease in the voltage output response of the device at increasing vibration frequencies. According to the present invention, a seismic vibration pickup device is provided which has electromagnetic damping without experiencing the undesirable decrease in voltage output response at increasing frequencies.

Moreover, according to the present invention, the natural reed resonance of the diaphragm springs can be damped so that no interference from that source appears in the voltage output response of the device.

The principal object of this invention is to provide a strong, rugged, yet sensitive seismic vibratory pickup device which can be easily assembled and maintained.

A further object of this invention is to provide a seismic vibratory pickup device which is operable at elevated and reduced temperatures.

Another object of this invention is to provide a seismic vibratory pickup which is electromagnetically damped to avoid interference in the voltage output response due to the natural resonating frequency of the spring mounted inertia coil.

A further object of this device is to provide a seismic vibratory pickup device which does not experience undesirable decreases in its voltage output response at high frequency vibration exposures.

Another object of this invention is to provide a seismic vibratory pickup device employing an inertia mass oscillatably suspended between diaphragm springs and having a voltage output response which is unaffected by the reed resonating characteristics of diaphragm springs.

These and other objects of the present invention will become apparent from the following detailed description and accompanying drawings in which:

FIGURE 1 is a cross-section illustration of a vibratory pickup device according to the present invention;

FIGURE 2 is a plan view of a diaphragm spring treated in accordance with the present invention;

FIGURE 3 is a plan view of a wire connecting lug shown in cross-section in FIGURE 1;

FIGURE 4 is a graphical presentation of the voltage output response-frequency characteristic of a seismic vibratory pickup device having an electromagnetic damping bobbin;

FIGURE 5 is a graphical presentation of the voltage output response-frequency characteristics of the seismic vibratory pickup device of this invention; and FIGURE 6 is a graphical presentation of the voltage output response-frequency characteristic of the present seismic vibratory pickup device employing uncoated diaphragm springs.

According to the present invention two independent magnetic fields are provided within the casing of a seismic pickup device. An inductive coil mounted on a non-metallic spool is oscillatable within the first or signal magnetic field. A second metal spool which oscillates in unison with the inductive coil is mounted in the second magnetic field. The two spools are oscillatably suspended as a unit between the centers of diaphragm springs. The diaphragm springs have applied to their flat surfaces a coating of resilient material such as a thermoplastic resin.

Referring to FIGURE 1 a cylindrical metal casing 10 has an internal chamber 11 and, at one end, an internal shoulder 12. A nose plate 13 abuts against the internal shoulder 12 and has threaded holes 14 for securing to the outer surface a connector plate 15 by means of screws 16. Associated with the connector plate 15 is a threaded connector 17 through which two insulated electrical conductors 18, 19 enter the chamber 11.

An outer spacer ring 20 and an inner spacer ring 21, both formed from insulating material such as plastic or compressed fibers, abut the nose plate 13. A diaphragm spring 22 is secured between the inner spacer ring 20 and the outer spacer ring 21 so that it is electrically insulated from the metal casing 10. An annular steel outer signal pole piece 23 abuts the inner spacing ring 21. A signal ring magnet 24 of permanent magnetic material such as Alnico abuts the outer signal pole piece 23. An annular headpiece 25 abuts the signal ring magnet 24. Extending from the circular headpiece 25 is an inner signal pole piece 26 forming a hub which extends in one direction and an inner damping pole piece 27 forming a hub which extends in the other direction. A damping ring magnet 28 abuts the headpiece 25. An annular steel outer damping pole piece 29 abuts the magnet 28. A metal inner spacer ring 30 abuts the outer damping pole piece 29. A metal outer spacer ring 31 abuts the inner spacer ring 30. A second diaphragm spring 32 is secured between the inner spacing ring 30 and the outer spacing ring 31 in such manner that it is in peripheral electrical contact with the metal casing 10. A lock ring 33 abuts the outer spacer ring 31 and has a number of clamping screws 34 extending into threaded openings whereby the internal assembly may be rigidly fastened.

A peripheral snap ring groove 35 is provided in the inner wall of the casing 10 to receive a snap ring 36 which secures the lock ring 33. A tightly fitting end plug 37 is pressed into the open end of the casing 10. A threaded opening 38 may be provided in the end plug 37 to receive a vibratory pickup prod 39.

All of the elements heretofore described are stationarily and rigidly positioned within the chamber 11, with the exception of the diaphragm springs 22, 32 which are free to move at their centers while being rigidly fastened at their rims. Preferably the diaphragm springs 22, 32 are formed from beryllium-copper alloys, phosphorus-bronze alloys, steel and similar metallic materials.

The signal ring magnet 24 sets up a field of magnetic flux through the headpiece 25, the inner signal pole piece 26 and cross an annular gap to the outer signal pole piece 23. Similarly the damping ring magnet 28 sets up a field of magnetic flux extending through the headpiece 25, the inner damping pole piece 27, across an angular gap to the outer damping pole piece 29. Each of the two magnetic fields extends radially from an inner pole piece (26, 27) to an outer pole piece (23, 29).

The diaphragm springs, 22, 32, as already described, are peripherally secured between spacer rings about their rim portion 40 (FIGURE 2). Each of the diaphragm springs 22, 32 has a center opening 41 and a plurality of spirally arranged, relatively spaced cutout portions 42 which define vibratory reed portions therebetween. As will be hereinafter described in greater detail, the vibratory reed portions are coated on their flat surfaces with a film 43 of resilient plastic material.

A bobbin shaft 44 is slidably mounted within the hubs 26, 27 and is provided at each end with a threaded hole 45, 46. The bobbin shaft 44 is secured at each end to the diaphragm springs 22, 32 by means of screws 47, 48 extending into the threaded openings 45, 46 respectively.

A signal bobbin 49, formed from nonmetallic materials such as compressed fiber or plastic has a hollow cylindrical spool and an end wall having a hole adapted to engage one end of the bobbin shaft 44. An insulated washer 50 and a retaining washer 51 separate the diaphragm spring 22 from the head of the screw 47. A coil 52 of magnet wire having about 5,000 turns is wound around the spool portion of the nonmetallic signal bobbin 49. A pair of lugs 53, 54 each formed from a flat sheet of metal as shown in FIGURE 3 is included in the assembly. Each of the lugs 53, 54 includes a flat washer with a radial extension. The lug 53 is in contact with the surface of the diaphragm spring 22 adjacent to its center opening 41 but is insulated from electrical contact with the bobbin rod 44 by means of a shoulder formed in the nonmetallic end wall of the signal bobbin 49. The lug 54 has its radial extension placed through an opening in the end wall of the signal bobbin 49 and is maintained in electrical contact with the bobbin rod 44. One wire end 55 extending from the coil 52 is soldered to the radial extension of the lug 53; the other wire end 56 extending from the coil 52 is soldered to the radial extension of the other lug 54. A rubber O-ring 57 is provided to secure the connection between the signal bobbin 49 and the bobbin rod 44. The rubber O-ring 57 further serves as a motion arresting bumper to prevent excessive axial movement of the bobbin rod 44 and its allied assembly.

At the other end of the bobbin rod 44 a damping bobbin 58 is provided formed from metal such as spun or cast aluminum. The damping bobbin 58 has a cylindrical spool and an end wall portion with a central opening to engage the end of the bobbin rod 44. A metal washer 59 is provided to secure the central portion of the diaphragm spring 32 against the end wall of the damping bobbin 58. A clamping washer 60 engages the head of the screw 48 to complete the assembly.

It will be observed that the signal bobbin 49, the bobbin shaft 44 and the damping bobbin 58 are rigidly secured in an integral assembly which is free to oscillate longitudinally upon movement of the diaphragm springs 22, 32. There are no other moving parts in the apparatus.

The conductor 19 is soldered within the chamber 11 to a bare spot on the periphery of the diaphragm spring 22. The conductor 18 is clamped between the connector plate 15 and the nose plate 13 to provide a grounding connection in electrical contact with the metal casing 10.

*Operation*

When the casing 10 is caused to vibrate, either by direct connection with the extraneous source of mechanical vibrations or indirectly through a prod 39, the bobbin rod 44 and its allied structure tends to remain stationary because of its mass inertia while the casing actually vibrates in response to the extraneous vibrations. Hence there is relative oscillating motion of the casing with respect to the bobbins. During oscillation, the magnet wire forming the coil 52 cuts lines of magnetic flux extending across the gap between the inner signal pole piece 26 and the outer signal pole piece 23. According to the direction in which the signal bobbin 49 is moving, an electrical current is induced in the inductive coil 52 and transferred through the wire end 56, the lug 54, the bobbin rod 44, and thence through the diaphragm spring 32 to the metal casing 10 which communicates with the conductor 18. The other wire end 55 conveys the electrical signal through the lug 53 to the diaphragm spring 22 and thence to the conductor 19. The electrical signal is conveyed by means of a cable (not shown) which is coupled to the threaded connector 17 to suitable electrical analysis apparatus adapted to resolve the various components of the electrical signal for analyzing the mechanical vibrations to which the casing 10 is subjected.

Heretofore a unitary signal bobbin has been used in seismic vibratory pickup devices of this type, see U.S. Patent 2,754,435. That unitary bobbin has been formed from nonmetallic materials. An inventory of damping oil within the casing served to offset any tendency of the seismic system to increase its voltage output response at its natural resonating frequency which can be expressed as $$f = \frac{1}{2\pi}\sqrt{k/m}$$

Where:

$f$ is the resonant frequency
$m$ is the oscillating mass
$k$ is the spring contact of the system.

By eliminating the damping fluid, the seismic mass (including the signal bobbin) tends to become a moving mass when subjected to vibrations at its resonant frequency. It was found that the natural resonance could be overcome by forming the signal coil over a metal bobbin which counteracts movement of the inertia mass. However, at increasing frequencies of vibration, the damping bobbin caused a significant decrease in the output voltage response of the device as can be observed in FIGURE 4.

According to the present invention, the signal bobbin 52 is fabricated from nonmetallic materials such as compressed fibers or plastic. Thus the self-inductance properties of the coil 52 are allowed to manifest themselves under the influence of the magnetic field of the signal magnet 24. A separate magnetic field is set up for a separate metallic bobbin 58 under the influence of the damping ring magnet 28. It will be observed that as the bobbin rod 44 moves in one direction, both the signal bobbin 49 and the damping bobbin 58 move in the same direction. Thus the damping bobbin 58 is allowed to resist continuing motion in that direction by virtue of its movement through magnetic flux in the gap between the outer damping pole piece 29 and the inner damping pole piece 27. Response decrease at higher frequencies is not observed. Accordingly, the electrical response (i.e., the signal generated in the coil 52) per constant velocity vibration is virtually independent of frequency of mechanical vibrations.

Referring to FIGURE 5 there is illustrated a response-frequency characteristic for the vibratory pickup device illustrated in FIGURE 1. The response potential is virtually constant over the entire range of the frequencies from 10 to 1,000 cycles per second.

Diaphragm Springs

It has been observed that when the untreated diaphragm springs 22, 32 are allowed to vibrate in air, their inherent resonating frequencies interfere with the response of the vibratory pickup. The interference can be successfully dampened by vibrating the springs in a damping fluid such as oil. However, when the untreated diaphragm springs are assembled into the present vibratory pickup device without an inventory of oil in the chamber 11, the response-frequency characteristic manifested severe fluctuations as shown in FIGURE 6. These fluctuations result from the resonance properties of the uncoated diaphragm springs. It was found that by applying a thin coating of resilient, flexible, adhesive material to the reeds of the diaphragm spring, its tendency to exhibit resonating frequency vibrations was eliminated. Suitable coatings include flexible thermosetting resins and high melting point thermoplastic resins such as ethyl and butyl acrylates and methacrylates, polyesters, plasticized polyvinyl chloride, and the like. Accordingly, as shown in FIGURE 2, a resilient coating is applied to the flat surfaces of the diaphragm springs 22, 32 over the reed portions. The rim 40 and the flat surface surrounding the central opening 41 are uncoated.

The response-frequency characteristic shown in FIGURE 5 was obtained when coated diaphragm springs as described were assembled into the device shown in FIGURE 1. The erratic response attributable to spring reed resonance (FIGURE 6) is avoided.

An incidental benefit which has been observed from the present seismic vibratory pickup is that fewer turns of inductive coil are required to achieve a satisfactory voltage output response than hitherto employed in oil-filled vibratory pickup devices. In fact, with about 5,000 turns of wire in the present coil 52, the response is equivalent to that heretofore requiring about 10,000 turns of wire.

According to the provisions of the patent statutes, we have explained the principle, preferred embodiment and mode of operation of our invention and have illustrated and described what we now consider to represent its best embodiment. However, we desire to have it understood that, within the scope of the appended claims, the invention may be practiced otherwise than as specifically illustrated and described.

We claim:

1. In a seismic vibration pickup instrument including a case having an internal chamber and an inductive coil adapted to oscillate in a first magnetic field to generate electrical signals responsive to the vibrations of said case, the improvement comprising a first nonmetallic spool upon which said coil is wound, a second metallic spool secured in rigid relation to said first spool and adapted to oscillate in unison with said first spool, and a separate second magnetic field extending through said second spool but isolated from said inductive coil.

2. In a seismic vibration pickup device including a case having an internal chamber, a pair of axially spaced transverse diaphragm springs, a rod connecting the centers of said diaphragm springs, an inductive coil secured to said rod and adapted to oscillate in unison therewith in a first magnetic field, the improvement comprising a first nonmetallic spool upon which said coil is wound, a second metallic spool secured to said rod axially displaced from said first spool and adapted to oscillate in unison therewith, a separate second magnetic field extending through said second spool, and a resilient coating applied to the flat surfaces of each of said diaphragm springs.

3. The device of claim 2 wherein the said resilient coating is a thermoplastic resin.

4. A vibration pickup instrument comprising a case having an internal chamber having a wall at one end, a removable closure at the other end, a first transverse diaphragm in said chamber, a second transverse diaphragm in said chamber axially spaced from the first, an oscillatable bobbin shaft axially positioned in said chamber and connected at its ends to the centers of said diaphragms, a signal ring magnet concentric with said bobbin shaft, a damping ring magnet axially spaced from said signal ring magnet and being concentric with said bobbin shaft, inner pole pieces annularly positioned between said ring magnets and said bobbin shaft, outer pole pieces annularly positioned between said ring magnets and said bobbin shaft, a nonmetallic bobbin having wound thereon an inductive coil and being mounted to said bobbin shaft adjacent to said first diaphragm spring whereby said inductive coil may oscillate annularly between said inner and said outer pole pieces, a metallic bobbin secured to the other end of said bobbin shaft to oscillate annularly between said inner and said outer pole pieces, and two conductors extending through said wall and being secured in electrical conducting relation to the ends of said inductive coil.

5. A vibration pickup device comprising a case having an internal chamber having a wall at one end, a removable closure at the other end, means for attaching an external longitudinal prod to said closure, a first transverse diaphragm in said chamber electrically insulated from said case, a second transverse diaphragm in said chamber mounted in electrically conductive relation with said case, an oscillatable bobbin shaft axially positioned in said chamber and connected at its ends to the centers of said diaphragms and being electrically insulated from said first diaphragm, a signal ring magnet concentric with said bobbin shaft, a damping ring magnet axially spaced from said signal ring magnet and being concentric with said bobbin shaft, inner pole pieces annularly positioned between said ring magnets and said bobbin shaft, outer pole pieces annularly positioned between said ring magnets and said bobbin shaft, a nonmetallic bobbin having wound thereon an inductive coil and being mounted to said bobbin shaft adjacent to said first diaphragm spring whereby said inductive coil may oscillate annularly between said inner and said outer pole pieces, a metallic bobbin secured to the outer end of said bobbin shaft to oscillate annularly between said inner and said outer pole pieces, one end of said inductive coil being connected to said bobbin shaft and the other end being connected to said diaphragm springs, and two conductors extending through said wall and being secured one to said first diaphragm spring and the other to said case.

References Cited in the file of this patent

UNITED STATES PATENTS

| | | |
|---|---|---|
| 1,931,188 | Gauss et al. | Oct. 17, 1933 |
| 2,130,213 | Wolf | Sept. 13, 1938 |
| 2,340,777 | Stanley | Feb. 1, 1944 |
| 2,657,374 | Bardeen | Oct. 27, 1953 |